April 24, 1951 W. E. URSCHEL 2,550,129
VINE AND SEED STRIPPER
Filed Feb. 11, 1943 10 Sheets-Sheet 1
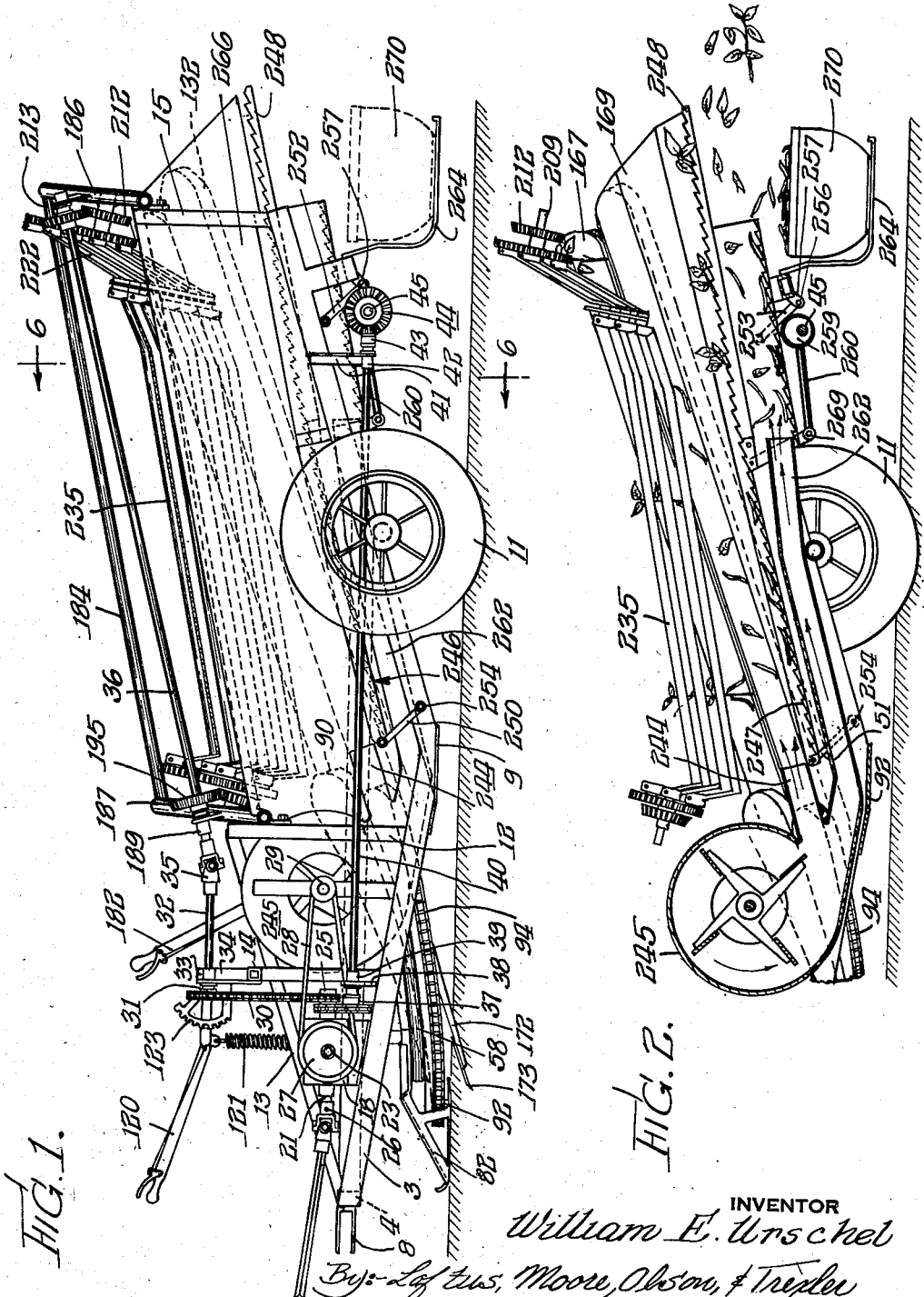
INVENTOR
William E. Urschel
By: Loftus, Moore, Olson, & Trexler
ATTORNEYS

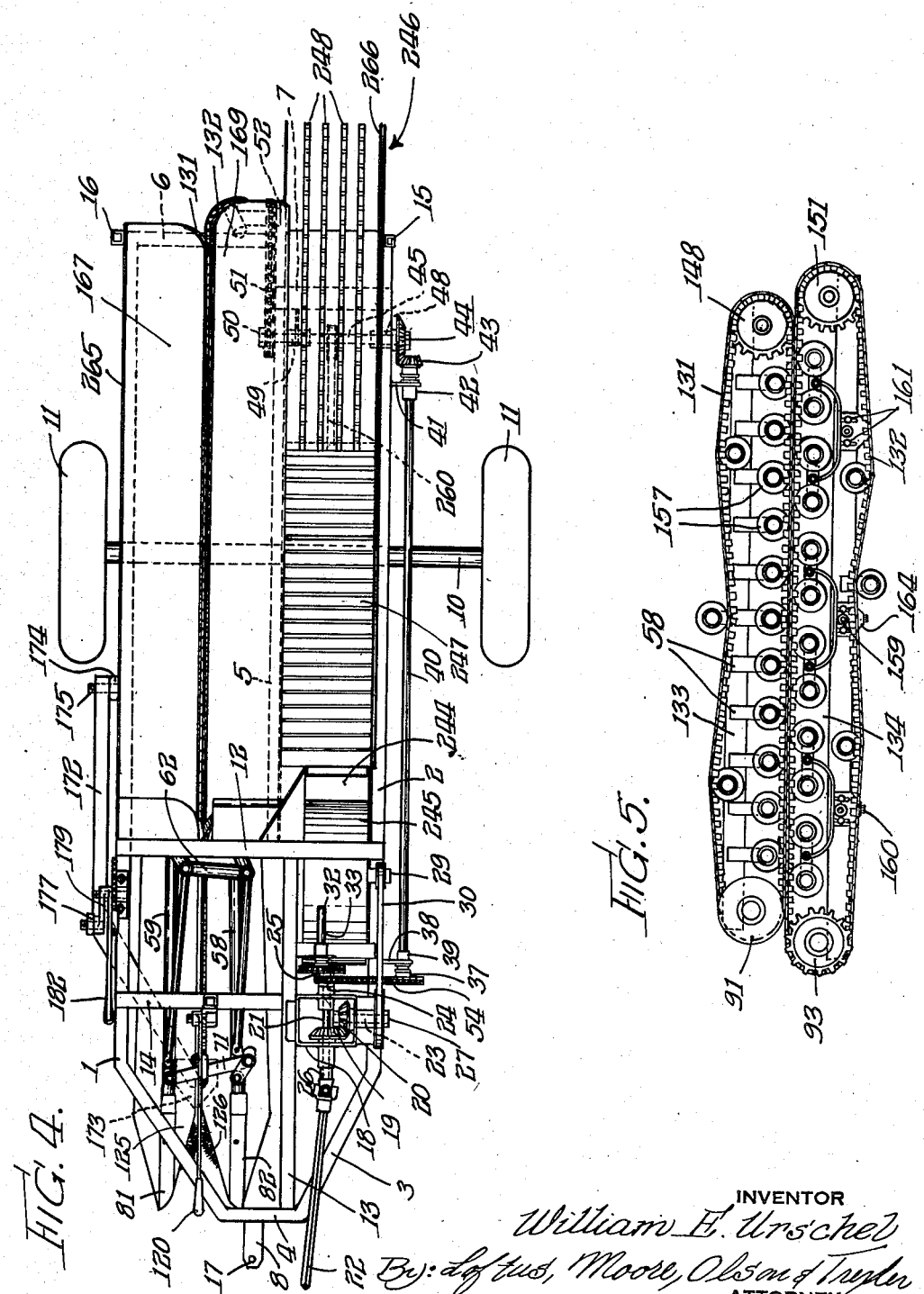

April 24, 1951 W. E. URSCHEL 2,550,129
VINE AND SEED STRIPPER
Filed Feb. 11, 1943 10 Sheets-Sheet 4

INVENTOR.
William E. Urschel
BY
Loftus, Moore, Olson & Trexler
ATTORNEYS.

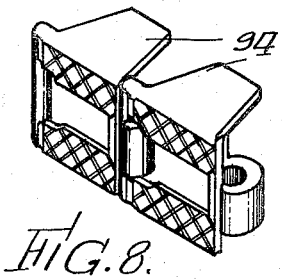
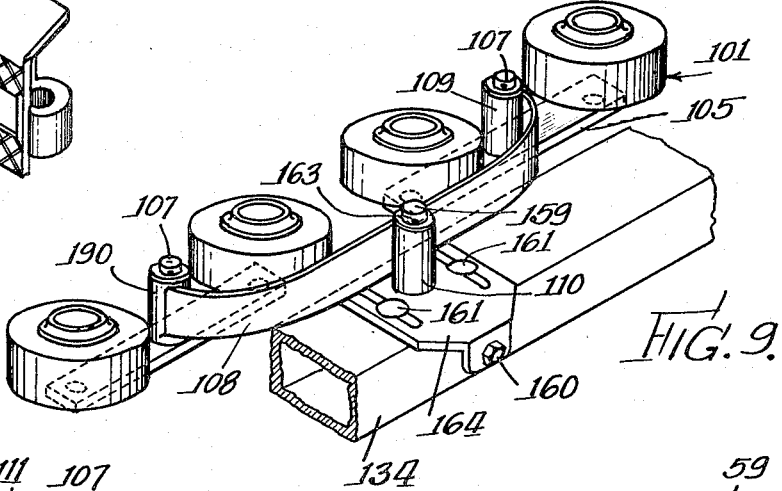
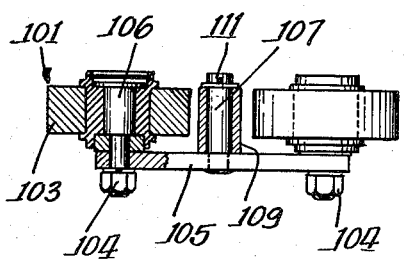
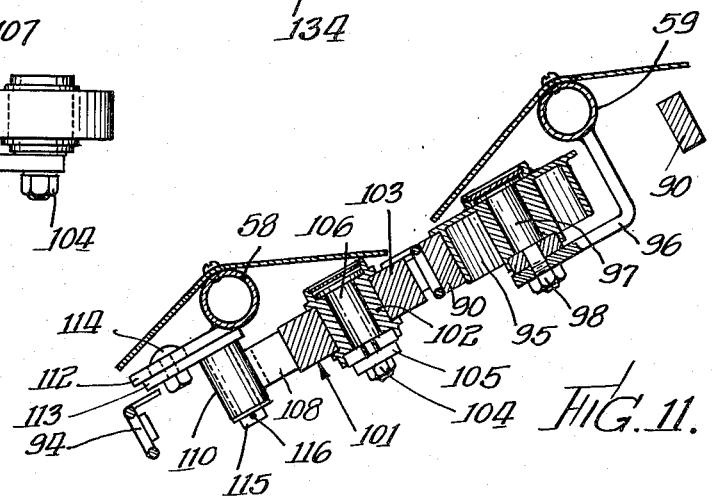
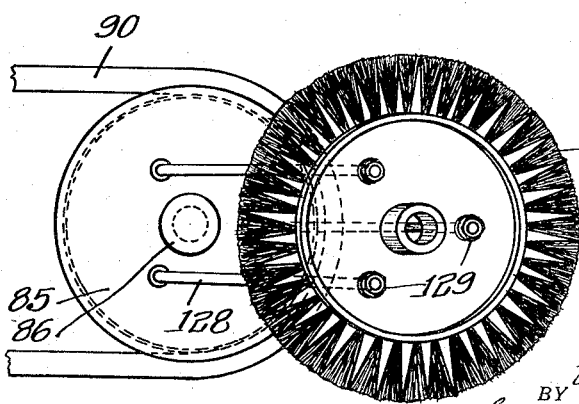

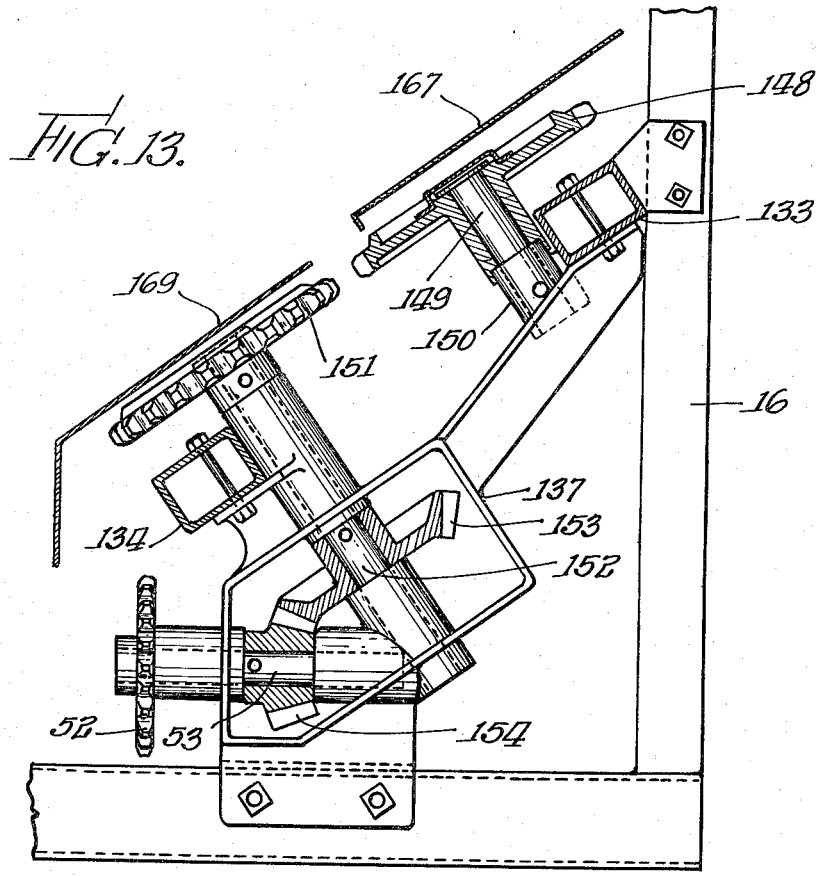
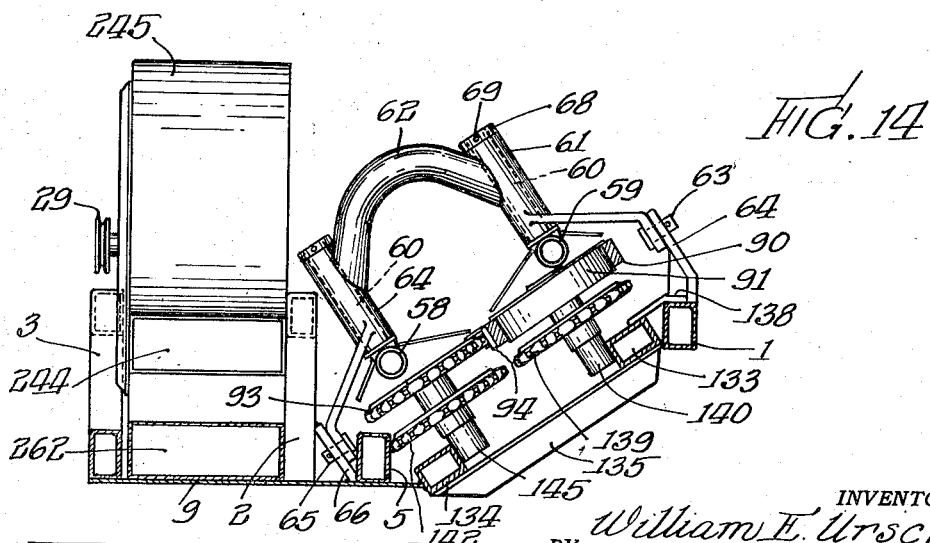

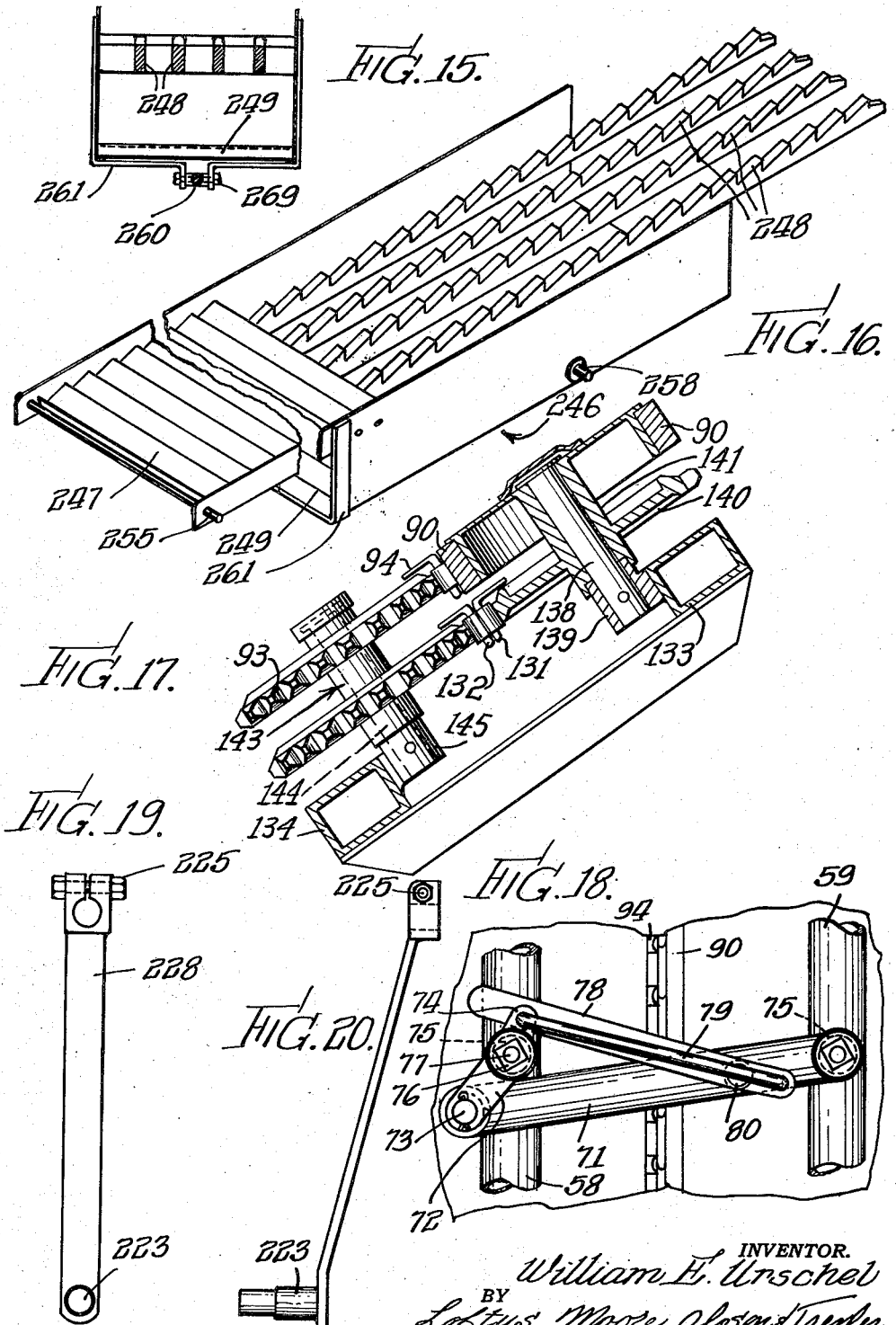

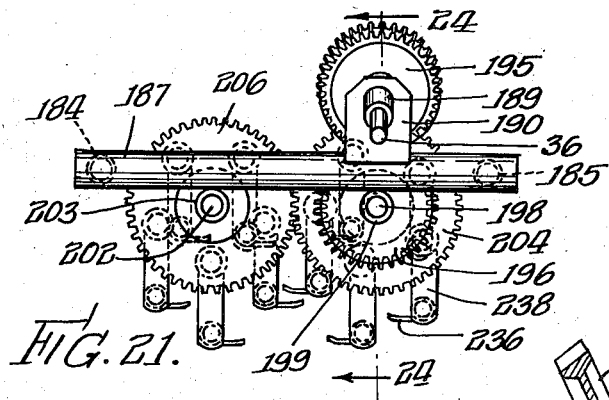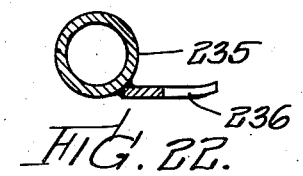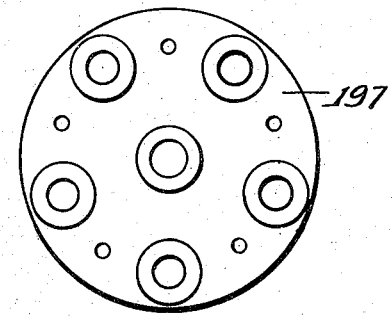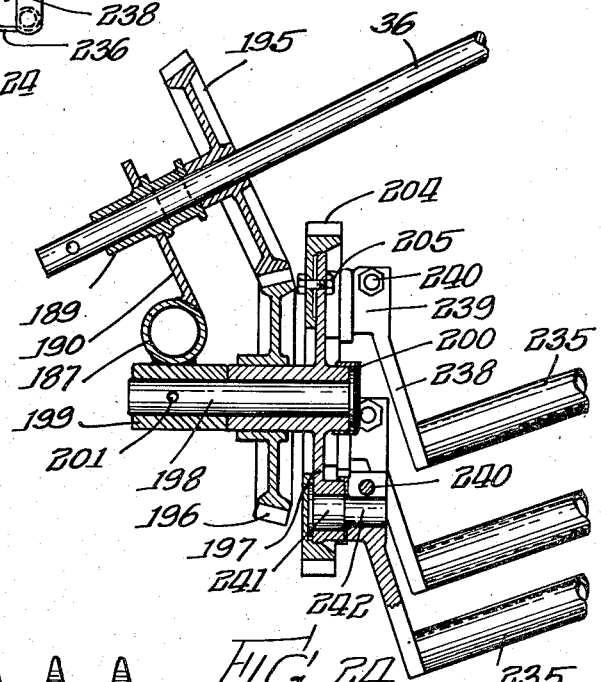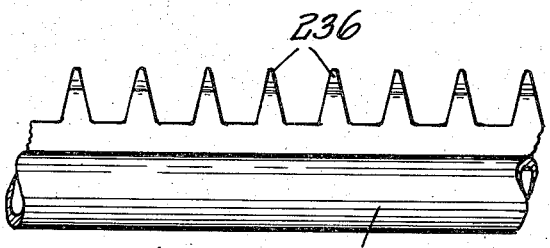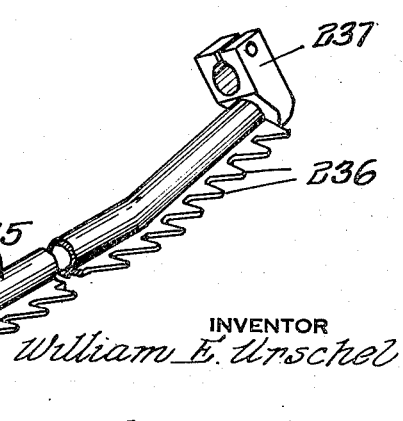

April 24, 1951  W. E. URSCHEL  2,550,129
VINE AND SEED STRIPPER
Filed Feb. 11, 1943  10 Sheets-Sheet 9

INVENTOR
William E. Urschel
By: Loftus, Moore, Olson & Trexler
ATTORNEYS

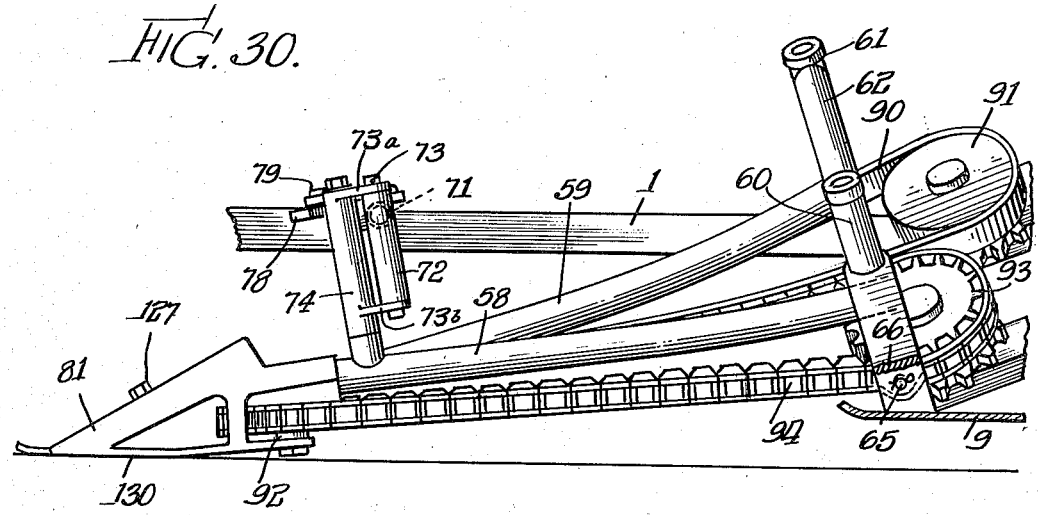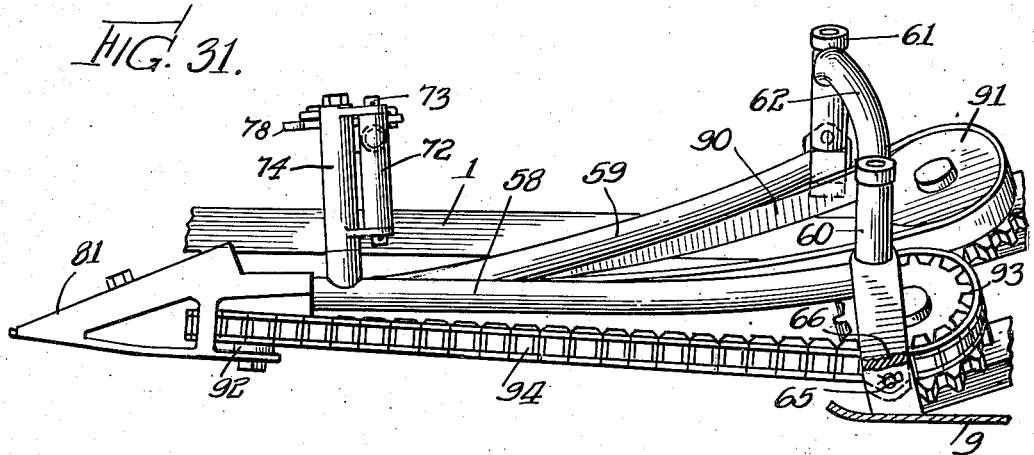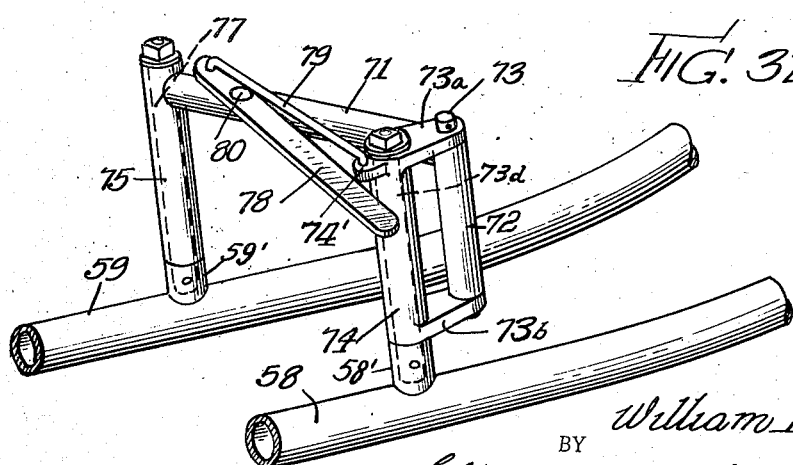

Patented Apr. 24, 1951

2,550,129

UNITED STATES PATENT OFFICE 2,550,129

VINE AND SEED STRIPPER

William E. Urschel, Valparaiso, Ind.; Joe R. Urschel administrator of said William E. Urschel, deceased Application February 11, 1943, Serial No. 475,478

2 Claims. (Cl. 56—130)

The present invention relates to mechanisms for harvesting crops generally, including green beans, wax beans, soy beans, peas and other crop-bearing plants directly from the plants as they grow in the field, and more particularly it is related to an improved device adapted to move along a row of crop-bearing plants, pull the plants bodily by the roots from the ground, convey them through the machine, and to strip the crops therefrom, separate the crops from the plants and any leaves which have been pulled from the plants, and discharge the crops at one point on the machine and the plants and leaves at a separate point on the machine.

The present invention provides a construction wherein the machine is reduced to very simple mechanisms adapted to carry out the functions hereinbefore set forth, with a minimum of parts, with simplicity in construction and lightness in weight.

With regard to certain aspects of the invention it is concerned with improvements over the constructions of my prior Patents 1,727,020, issued September 3, 1929, and 1,948,975, issued February 27, 1934. However, it is to be understood that the constructional features of the present invention are not confined to the type of machine set forth in my prior patents.

One of the important features of the present invention resides in the arrangement of a plant stalk conveyor and crop pickers wherein the plant, after being pulled from the ground, is shifted bodily to an inclined position of approximately thirty-five degrees with respect to the vertical, being thus held and conveyed along a predetermined path, together with an arrangement of the pickers on each side of the inclined plant to strip the crops therefrom, and the disposition of conveying and separating mechanism disposed laterally of the inclined conveyor whereby the inclined plant held in the conveyor is discharged from the machine and whereby the crops stripped by the pickers will slide or fall immediately laterally onto the conveyor which is provided with means for removing the leaves and stray plants from the crops and whereby the crops, freed of all dirt, leaves and plants, are discharged from the machine at a remote point.

Another object of the invention resides in the arrangement for causing the plants to travel through the machine uniformly inclined in one direction with respect to the vertical, whereby the taller plants will all topple in one direction adjacent underlying crop conveying mechanism and/or whereby also picking mechanism associated with the inclined plants is likewise inclined with respect to the vertical and with respect to the inclined plant conveying means; the arrangement being such that the action of the picking means is to project the stripped crops in a diagonally upward position away from the plant conveyor and in such a manner that the stripped crops will tend to fall clear of the picking mechanism and onto the crop conveying means.

Yet another object of the invention resides in the arrangement of the picker driving mechanism whereby the same are driven from both ends to provide ease and durability in operation and a much sturdier construction.

Another object of the present invention is to provide a machine of the character hereinbefore described wherein a single unit is provided which serves both as a conveyor and a cleaner for removing the dirt, leaves and plants from the separated crops. This is preferably accomplished by the use of a shaker conveyor and by the use of an appropriately designed and associated air blast, together with the arrangement of the same longitudinally and laterally of the inclined and elevated stalk conveyor mechanisms.

Also, another object of the present invention is to provide an improved bean elevator which is simple in construction, free-running and light in weight.

Yet another object of the invention resides in providing a simple construction for pulling the crop-bearing plant from the ground and for conveying the plant through the crop picking machine.

Yet another object is to provide an improved form of picking means itself; to provide an improved form of means for cleaning the conveying mechanism; to provide an improved means for releasing the grip of the stalk or plant pulling members in the event a stone or other object lodges therebetween; to provide improved means for providing for both lateral and vertical movement or adjustment of the stalk pulling means whereby it may be adjusted both laterally and vertically with respect to a row of plants to be pulled from the ground during the operation of the machine; to provide a picking unit for a green bean and pea harvester wherein the picking units are set on a slope of about 35° whereby when the green beans are snapped and tossed away from the conveyed bushes the beans fall free of the picker fingers and preferably to one side thereof, where they pass through a blast of air onto a picker conveyor. This air removes the greater amount of refuse from the bean pods; to provide an arrangement of picker units disposed at an inclination to the vertical with respect to the bushes from which the beans are to be stripped, the arrangement being such that the tall bushes or vines will all incline or hang to the same side as they begin to enter between the picker fingers whereby the machine can be more easily adjusted to handle them all.

Still another object resides in providing in combination with the inclined arrangement of the picker fingers an equal inclination of the stalk conveyor belts whereby the vibratory movement and motion of these belts causes any pods which lodge on the top of the belt to be shaken off.

Yet another object resides in providing an arrangement of belts or chains which underlie the picker fingers, the inclined chains being arranged so that the upper inclined chain is raised above the lower inclined chain so that beans sliding from the upper chain will be projected across the gap between these chains that is occupied by the stalk conveyors and will thence jump the gap and slide down the lower chain onto the pod conveying mechanism; to provide these and other objects of invention as will be apparent from a perusal of the following specification when taken in connection with the accompanying drawings wherein:

Figure 1 is a side elevation of a bean elevator as viewed from the left side.

Figure 2 is a somewhat diagrammatical view in section of the cleaning unit.

Figure 4 is a plan view of the machine with the picking unit removed.

Figure 5 is a plan view of the stalk holder and conveyor.

Figure 8 is a perspective view of a portion of the puller and stalk holder chain.

Figure 9 is a perspective view showing the spring support for the puller and stalk holder chain rollers.

Figure 10 is a side view partly in section of the puller and carrier chain rollers.

Figure 11 is a transverse section of the pullers taken on line 11—11 of Figure 3.

Figure 12 is a top view of the pod lifter brush showing its driving means.

Figure 13 is a rear view of the stalk conveyor drive and support.

Figure 14 is a rear view in transverse section of the puller support taken on line 14—14 of Figure 3.

Figure 15 is a transverse section of the shaker conveyor.

Figure 16 is a perspective view of the shaker conveyor.

Figure 17 is a view from the rear of the front sprockets of the stalk conveyor.

Figure 18 is a top view of the front arch support of the stalk pullers showing the tension release mechanism.

Figure 19 is a front view of the rear pod picker arms.

Figure 20 is a side view of the rear pod picker arms.

Figure 21 is a front view of the forward pod picker drive.

Figure 22 is an enlarged transverse section through a picker bar.

Figure 23 is a front view of a picker drive plate.

Figure 24 is a side view in section of the forward pod picker drive taken on line 24—24 of Figure 21.

Figure 25 is an enlarged fragmentary plan view of a picker bar.

Figure 26 is a perspective view of a picker bar.

Figure 30 is a side view of the stalk puller showing the device in lowered position.

Figure 31 is a similar view, but showing the stalk puller in raised position.

Figure 32 is a fragmentary perspective view of the manual means for separating the stalk puller frame members.

Figure 3:
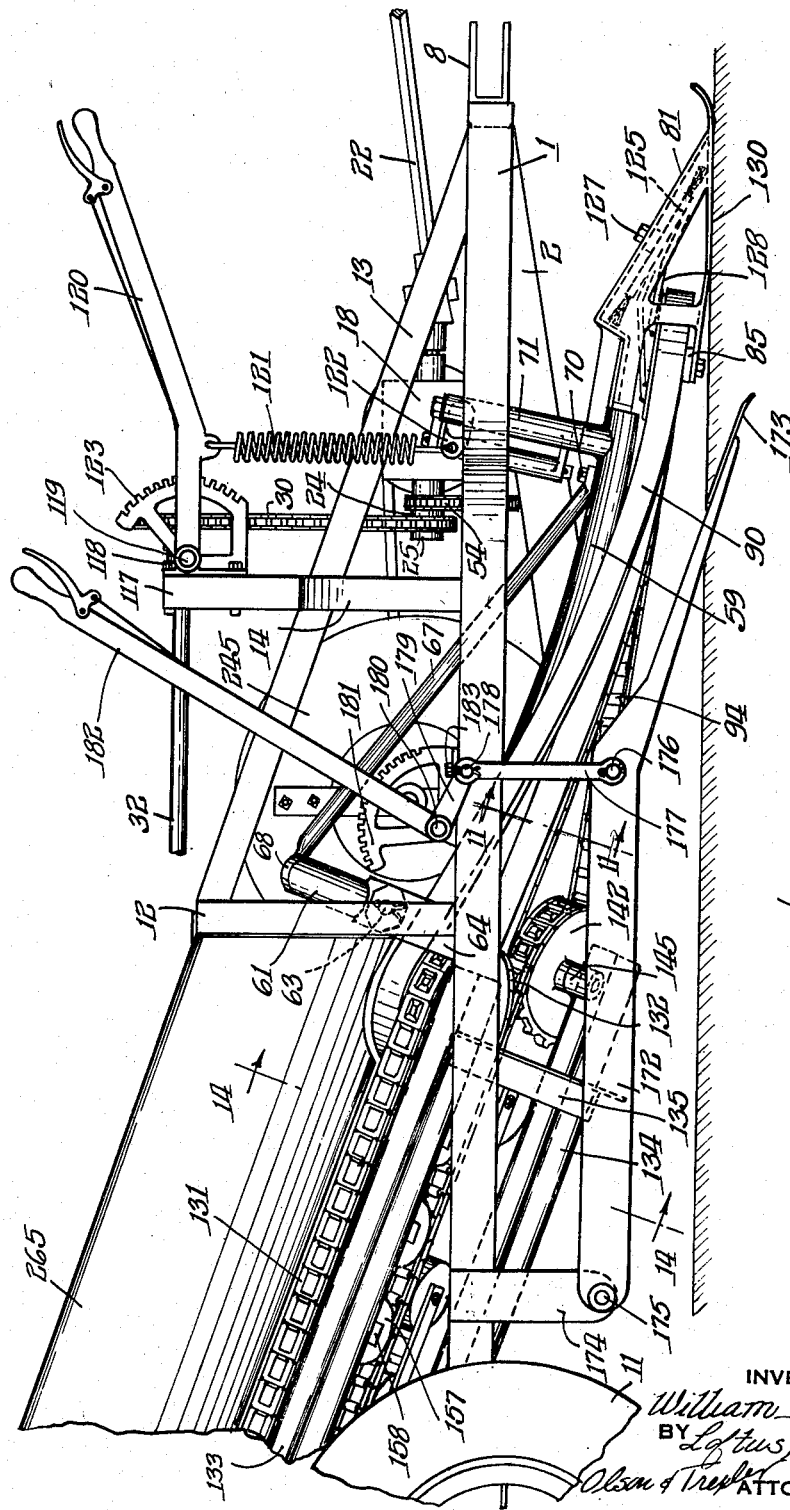
Figure 3 is a side view of the front portion only of the machine, viewed from the right hand side of the machine.

Referring now to the drawings in detail for a description of that form of the invention which is preferred, and particularly referring to Figures 1, 3, 4 and 6 thereof, the main frame for the machine comprises two outside longitudinal members 1 and 3 which at the front are bent toward each other and are securely joined together and held in spaced relation by a short transverse front frame member 4. These members of the frame are secured together preferably by welding. A transverse plate 9 (see Figures 1 and 14) is welded to the longitudinal frame member 3 and forms a slide to protect the mechanism in the event that the machine passes over some obstruction on the ground. A longitudinal frame member 2 is welded at its forward end to the transverse frame member 4 and extends rearwardly to this plate 9 to which it is securely fastened. Another longitudinal frame member 5 is welded to plate 9 and extends rearwardly to a transverse rear frame member 6 which member joins together longitudinal frame members 1 and 5 at their rearmost ends. A substantially hook-shaped transverse member 7 joins together the longitudinal frame members 5 and 3 at the rear end of the machine. In addition, in order to support the ground wheels, a transverse tubular member 10 is welded to the longitudinal member 1, 3 and 5 (see Figure 6). This tubular member 10 terminates at each end with a steel axle on which are rotatably mounted ground wheels 11. Toward the front of the machine a transverse arch member 12 is secured to the longitudinal frame members 1 and 3 to provide a support for the forward end of the picker frame hereinafter described. A brace 13 secured to this arch member 12 extends forwardly and downwardly (see Figure 3) and joins the transverse member 4 to stiffen the frame. Vertical frame members 15 secured to the rear end of the longitudinal frame member 3 and vertical members 16 secured to the rear end of the longitudinal frame member 1 support the picker frame at the rear end thereof. At the forward end of the frame and welded to the transverse member 4 a clevis bracket 8 is provided which is pivotally mounted to the draw bar of a conventional type of tractor to provide the motive power for pulling the harvester along the crop row.

*Transmission mechanism for the device*

Near the front end of this frame just described and mounted between and secured to the longitudinal frame members 2 and 3, as fully shown in Figures 1 and 4, is a gear box 18 which provides bearings and a longitudinal shaft 21. This shaft 21 is driven by the power take-off shaft of the tractor through a conventional type universal joint assembly 22. One end of this universal assembly 22 is secured to the spline take-off shaft of the tractor and the other end is secured to the shaft 21 by pin 26. Thus rotative power is transmitted to shaft 21 by the tractor which likewise pulls the harvester in the field. Referring to Figure 4, a bevel gear 19 keyed to shaft 21 drives a bevel gear 20 keyed to a transverse shaft 23 journalled in the gear box 18. A V-belt pulley 27 secured to the outer end of shaft 23 drives pulley 29 of a fan, hereinafter described, through a V-belt 28. A sprocket 24 keyed to the rear end of shaft 21 drives another sprocket 37 through the chain 54. This latter sprocket 37 is keyed to a longitudinal shaft 40 journalled in bearings 39 and 42. The bearing 39 is secured to the bracket 38 at the front of the machine and welded to the frame member 3, while the bearing 42 is secured in bracket 41 which is welded to the frame member 3 at the rear of the machine. On the rearmost end of this shaft 40 is keyed a bevel gear 43 which drives another bevel gear 44. This latter gear 44 is secured and fixed on a transverse shaft 45 which is journalled in the bearing brackets 48 and 49 welded to the transverse member 7. Sprocket 50 keyed to the transverse shaft 45 (see Figure 4) drives sprocket 52 through chain 51 and sprocket 52 is securely fixed to the stalk conveyor drive shaft 53 hereinafter more fully described. Another sprocket 25 at the front of the machine (as shown in Figure 4) is keyed to the rear end of shaft 21 and drives sprocket 31 by means of chain 30. This sprocket 31 is keyed to shaft 32 which is journalled in bearing 33 of the bearing bracket 34. Shaft 32 is coupled to the picker drive shaft 36 by the universal joint 35.

*The plant puller and stalk conveyor*

Simple means is provided for pulling the stalk from the ground as the machine passes longitudinally of and along and under the row of bean plants. In addition, this means is adapted to elevate the plant which has been pulled out of the ground to a position such that the stalk of the plant will be seized by the conveyor mechanism and carried longitudinally of the machine and in association with the picker mechanism for stripping the beans from the plant while thus held and conveyed.

Mounted at the the front end of the frame between the frame members 1 and 2 are the stalk pullers. Reference is made particularly to Figures 3, 8 and 9. Stalk pulling means is supported by two normally parallel tubular frames 58 and 59. The rear ends of these two frames are pivotally mounted so as to permit the front ends to swing together in a direction laterally of the longitudinal axis of the machine whereby to permit the stalk pullers to be registered or adjusted to the line of plants to be pulled and stripped. At its rear end each frame has welded thereto an upright pin 60 (see particularly Figure 14). Each one of these pins is pivotally mounted in turn in a sleeve-like bearing 61 of a rear arch bracket or support 62 which rigidly unites these two sleeve-like bearings. This bracket 62 is in turn pivotally mounted to swing about a substantially horizontal axis herein shown as preferably inclined to a horizontal plane, for purposes hereinafter set forth, so as to permit the front ends of the tubular frames 58 and 59 to swing in a substantially vertical direction toward and away from the ground whereby to permit the vertical adjustment of the plant and stalk pulling mechanisms. To this end a bracket 62 is pivotally supported on the right side on the pivot pin 63 secured in a bracket 64 welded to the longitudinal frame member 1. On the left side the bracket 62 is pivotally mounted on the pin 65 secured in plate 66 welded between the longitudinal frame members 2 and 5. In addition there is a rigidifying tubular brace 67 (see Figure 3) which at its rear end terminates in the ring 68 that is mounted on the upright pin 60 and secured thereto by pin 69. The lower front end of this brace 67 is secured to the tubular frame member 59 by the bolt 70. A similar brace for the other frame member 58 thus stiffens the assembly. The stalk puller frames 58 and 59 are held in spaced relation at the forward end by a front bracket comprising a tubular cross arm 71 (Figs. 18 and 30–32) connected to a vertical sleeve 75 pivotally shiftable about the upright pin 77 and rigidly carried by a sleeve 59' integral with the top of the puller frame 59. The opposite end of the arm 71 is rigidly connected to a vertical elongated sleeve 72 having protruding ends 73 which are pivotally mounted in ears 73A and 73B of a sleeve 74 which swings about a vertical pin 73D projecting upwardly from a projection 58' on the top of the puller frame 58. In addition the upper portion of the ear 73B is provided with a lateral extension 74' to which is pivotally connected one end of a rod 79 the opposite end of which rod is pivotally connected to a hand lever 78 which in turn is pivoted to the bar 71 at 80. Thus, by moving the hand lever 78 the stalk puller frames 58 and 59 may be spread apart so as to permit any foreign object lodged in the stalk pullers to be easily removed.

A spring mechanism may be used in connection with the mechanism of Figures 18 and 32, interconnecting the rod 79 with an upward extension on the sleeve 74. In this event there is provided an upstanding ear having an opening for the rod 79 to pass through, being extended on the other side and a coil spring would stretch between a nut on the far end of the rod 79 and this upstanding ear so as constantly to maintain the free end of this rod away from the upstanding ear. This would tend constantly to force the two elongated members 58 and 59 away from each other in the event that a stone was lodged therebetween.

Figure 7:
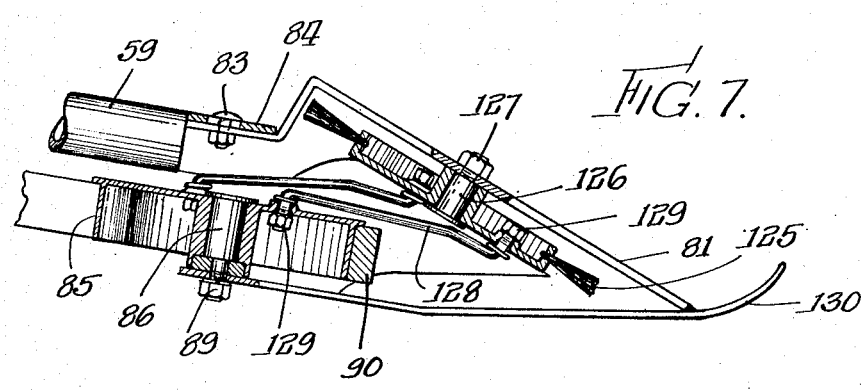
Figure 7 is a side view partly in section of the pod lifter, showing its driving mechanism.

The forward ends of these stalk puller frames 58 and 59 terminate in a flat plate 84, see Figure 7, to which flat plate is secured the front idler holder bracket 81 by means of the bolts 83.

Means is provided for pulling the plants from the ground so that they can be carried upwardly in substantially erect position and at the same time pulled from the ground. This is preferably accomplished by an idler wheel 85 which is rotatably mounted on a stud 86, see Figure 7, securely held in the idler holder 81 by the nut 89. An endless rubber-covered belt 90 engages this idler wheel 85 and the belt extends rearwardly to the wheel 91, as shown in Figure 14. Similarly an idler holder is likewise secured to the other puller frame 58 and this holds an idler sprocket 92. An endless chain 94, see Figures 1, 14 and 17, engages the idler sprocket 92 and the sprocket 93. The endless rubber-faced belt 90 and the opposed chain 94 grippingly coact in pulling the stalk of the plant from the ground.

The endless belt 90 is guided and held in position by a plurality of idler rollers 95 as shown in Figure 11. These idler rollers are rotatably mounted on studs 97 secured in brackets 96 by the nuts 98. The brackets 96 are welded to the puller frame 59 at proper intervals. To hold the chain 94 against the rubber-faced belt 90, a plurality of idler rollers 101 are used. These idler rollers 101 are made up of a hub portion 102 which holds a disc 103 of yielding material, such for instance as rubber. Each idler roller 101 is rotatably mounted on studs 106 which are secured on each end of an equalizing bar 105 by nuts 104, see Figures 9 and 10. At the center of each equalizing bar is secured a stud 107. An arch spring 108 is employed to hold the idler rollers 101 in position and to urge them against the puller chain 94. At each end of the spring 108 is a bearing 109 in which the studs 107 of the equalizing bars are pivotally mounted. These studs 107 are retained in proper position in the bearings 109 by a washer and cotter pin 111. Figure 9 illustrates the spring 108 as assembled with the two equalizing bars 105 and the four idler rollers 101.

The spring 108 is supported in the puller as shown in Figure 11. A plate 112 is welded to the puller frame 58. A spring holder 113 is secured to the plate 112 by bolts 114 and slots are provided in plate 112 for these bolts to permit adjustment of the tension of the spring 108. A stud 115 secured in spring holder 113 provides a pivotal mounting for the center bearing 110 of the spring 108 which is retained on stud 115 by the washer and cotter pin 116.

The front end of the stalk puller, comprising the endless rubber belt 90 and the chain, is supported by a hand lever 120, as seen in Figure 1, thereby providing an adjustment for the stalk puller while in the field and likewise to provide means for holding up the front of the stalk puller while travelling to and from the field, see also Figure 3. A notched segment 123 is secured by bolts 118 to an upright post 117 which is welded to the transverse frame member 14 and a conventional type of hand lever 120 is pivotally mounted on stud 119 secured in the segment 123. A tension spring 121 is hooked in hand lever 120 and extends downwardly to a hook in ear 122 of the front arch support 71. This method of supporting the stalk puller permits the front end of the stalk puller to adjust itself to the uneven contours of the ground. Furthermore, from the herein described construction, and particularly by reference to Figure 14, it will be seen that the rear arch support 62 is pivoted for more or less horizontal movement about the inclined axis of the substantially horizontally inclined pivots 63 and 65. This provides for the up and down, or substantially vertical, movement of the front part of the stalk puller mechanism. So also by referring to Figures 3 and 14 it will be seen that the axis of pins 63 and 65 passes approximately through the center of the chain 94 and the belt 90 at a point slightly ahead of the rear wheel and sprocket which are mounted on studs 138 and 144. These latter studs are rigid with respect to the main frame and thus when the front end of the stalk puller is raised or lowered a longitudinal curve of chain 94 and also of belt 90 must vary accordingly. Due to the flexibility of the chain belt this construction and operation is permissible.

So also by supporting the front end of the stalk puller by the spring 121 and by means of the pivoting of the substantially vertically inclined pins 60 within the sleeve 61, see Figure 14, the front end of the stalk puller is allowed a limited amount of lateral movement to align itself to the more or less irregularities of the row of beans, peas or other plants. From the foregoing description it will be noted that the pins 60 at the rear end of the puller frames 58 and 59 and the pins 75 at the front end of the puller frames, see Figure 18, are pivotally mounted in their respective bearings on the front and rear arch supports 71 and 62. This construction permits the lateral movement of the front end of the stalk puller as hereinafter described.

Mounted at the front end of the stalk pullers in the front idler holders 81 and 82 are two oppositely disposed pod lifting brushes 125 and 126. These pod lifting brushes 125 and 126 are adapted to brush up the low growing bean pods to prevent the pods rfom being gripped between the chain 94 and the belt 90. Referring to Figures 7 and 12, the right pod lifter brush 125 is rotatably mounted on the stud 126 which is secured in the idler holder 81 by the nut 127. The pod lifting brush 125 is rotated by idler wheel 85 by means of three cranks disposed in equally spaced bearings in the webs of the idler wheel 85 and the brush 125. The cranks 128 are retained on their bearings by nuts 129 which engage the threaded portions of the cranks 122 which extend beyond the bearings. Due to the angularity between the idler wheel 85 and the pod lifter brush 125 the bearings for the cranks 128 must have a certain amount of clearance. Similarly, the left pod lifter brush 126 is driven by the idler sprocket 92. It will be noted that the front idler holders 81 and 82 form a guard over the pod lifter brushes 125 and 126 and are shaped to guide the bean stalks between the brushes. The idler holders also have a runner-like portion 130, to guide the front end of the stalk pullers over the ground.

Mounted to the rear of the stalk pullers and in a position to receive the bean stalks from the pullers is a stalk conveyor. This stalk conveyor is adapted to grasp the bean stalk by the root portion projecting below the chain and belt of the pullers and to convey the bean stalks in the inclined position to be acted upon by the picking means. See Figures 5, 9, 10, and 17. The stalkes are held and conveyed by two oppositely disposed and co-acting chains 131 and 132, two links of which are illustrated in Figure 8. The frame to support the various parts of the stalk conveyor is comprised of two oppositely disposed parallel frame members 133 and 134 held in spaced relation at the front and by the angle member 135, at the center by the bracket 136 and at the rear by the drive bracket 137. The stalk holder frame is rigidly fastened to the main frame at the front end by welding the stalk holder frame member 134 to the plate 9 and by welding the frame member 133 to main frame member 1, see Figure 14. The stalk conveyor frame member 133 is further secured to main frame member 1 by a clip 138 which is welded to both members. The bracket 135 at the center of the stalk conveyor is welded to the main frame members 1 and 5. The stalk conveyor is supported at the rear end by the drive bracket 137 which is bolted to the main frame member 6 and the upright member 16. As shown in Figure 17, the right holder chain 131 is supported and guided at the front end by the sprocket 140 which has a hub 141 in common with the stalk puller wheel 91. The hub 141 is rotatably journaled on a stud 138 which is secured in the knob 139 welded to the right stalk holder frame member 133. Similarly the front end of the left stalk holder chain 132 is guided and supported by the sprocket 142 which has a hub 143 in common with sprocket 93 which drives the stalk puller chain 94. The hub 143 is rotatably mounted on stud 144 which is securely fixed in the knob 145 welded to the left stalk holder member 134.

By reference to Figure 13 it will be seen that the rear end of the right stalk holder of the chain is supported and guided by the sprocket 148 which is rotatably mounted on the stud 149. This stud 149 is securely fixed in the knob 150 which is welded to the right stalk holder frame member 133. The rear end of the left stalk holder chain 132 is supported and guided by the main drive sprocket 151. The drive sprocket 151 is mounted on and pinned to a drive shaft 152 which is journaled in the drive bracket 137, see Figure 13. Bevel gear 153 pinned on shaft 152 is driven by bevel gear 154 which is pinned to shaft 53. Said shaft 53 is also journaled in drive bracket 137 and is driven by sprocket 52, the drive for which has heretofore been described.

Figure 6:
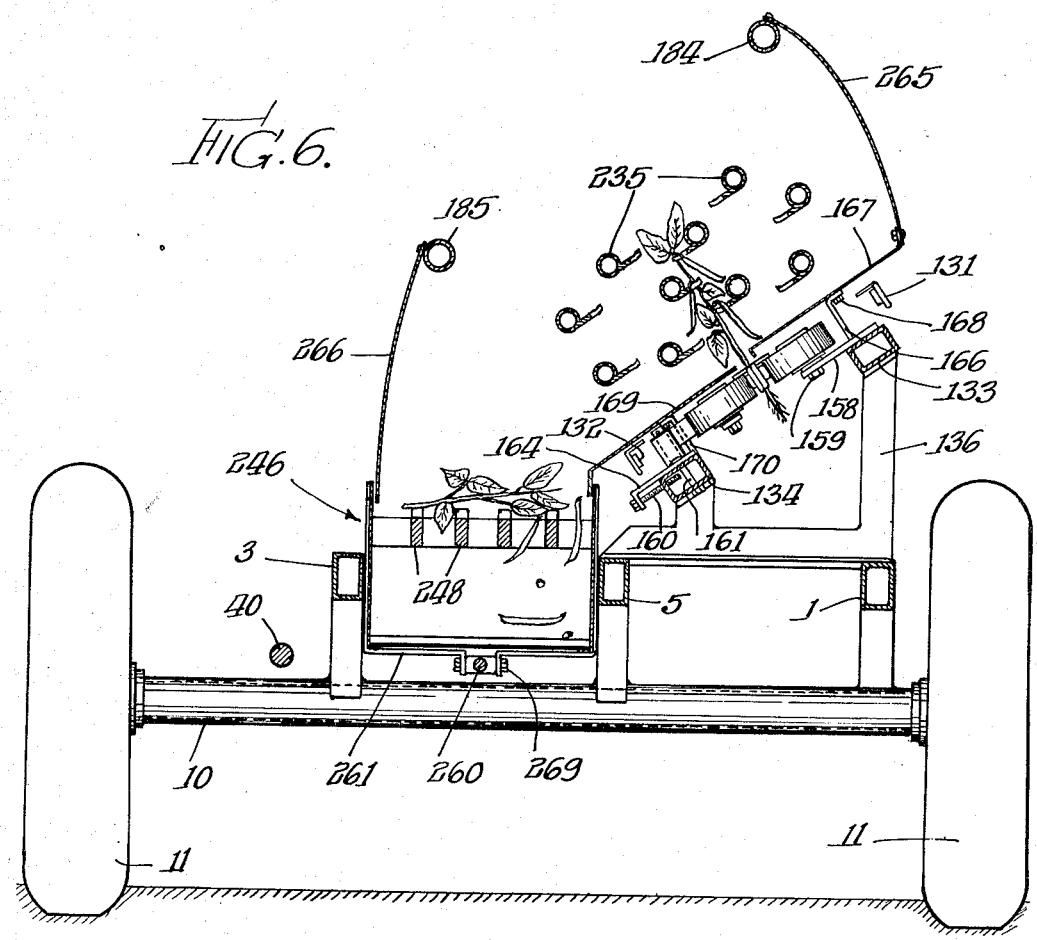
Figure 6 is an enlarged rear view in section, taken on the line 6—6 of Figure 1.

In Figures 5 and 6 the right stalk carrier chain 131 is shown as guided and held in position between the two end sprockets by a plurality of idler wheels 157 which are rotatably mounted on studs which are secured by nuts 159 in the brackets 158, which are welded at spaced intervals on the stalk holder frame member 133. These idler wheels 157 are rubber faced of the same construction as the idlers 101 of the stalk pullers. The stalk holder chains 131 and 132 are pressed tightly together by the spring tensioned idler rollers 157 on the left side of the stalk holder chains 132. The same arched spring assembly as described for the stalk puller chain is used and comprises the arched spring 108, two equalizing bars 105, and four rubber faced idler rollers. Three such assemblies are used in the stalk holder. The spring holders 164 are held to the left stalk holder frame member 134 by bolts 161. Slots 162 in the spring holder 164 permit adjustment of the spring tension which is regulated by the capscrew 160. The arched spring 108 is pivotally mounted on stud 159 which projects upwardly from the spring holder 164. The spring 108 is retained in position on the stud 159 by a washer and cotter pin 163. Sufficient idlers may be provided on the outside of the stalk holder chains to guide and support the chains.

From the foregoing description it will be noted that the stalk carrier chains are pressed tightly together and as the left stalk holder chain 132 is power driven by the drive sprocket 151, the opposed chain 131 will be driven by contact with the stalk holder chain 132. As sprocket 142 of the left stalk holder revolves with the sprocket 193 of the stalk puller, the puller chain 94 will also be driven. Sprocket 140 of the stalk holder is driven by the stalk holder chain 131 and as the sprocket 149 and the wheel 91 revolve together, the belt 90 is also driven. Puller chain 94 also assists in driving belt 90 due to the fact that the chain 94 is pressed firmly against the belt 90 by the idler wheels 103.

To prevent the bean pods from falling from the machine, sheet metal plates or members are installed over the stalk pullers, see Figure 6. Such a plate 167 over the right stalk holder is held in position by brackets 166 welded to the stalk holder frame member 133. The plate 167 is secured to the brackets 166 by bolts 168. Bean pods that fall on the plate 167 slide on to plate 169 which is secured in position over the left stalk holder by brackets 170 welded to the left stalk holder frame member 134. The plates 167 and 169 form a slide which guides the bean pods into the cleaning means.

By reference to Figure 6 it will be noted that the picking units are set on a slope of about 35° relatively to the vertical, which helps very materially since the bean pods when snapped and tossed away from the plants or bushes do not fall back on the picker fingers, but on the contrary are tossed to one side where they fall through the blast of air and onto the picker conveyor. The air and conveyor remove the greater amount of refuse from the bean pod. Furthermore, while setting the picker units on the angle, the tall bushes or vines, as they are fed through the conveyor, are placed in a better position for picking because the tops of the vines will all tend to hang to that side adjacent the shaker conveyor, in which position the machine can be adjusted to handle them much more advantageously. On types of machines where the plant is conveyed through vertically, as in some of my prior patents, a tall, heavy, dangling top of plant will lop over one way or the other and be out of control.

It will thus be seen that as the crop-bearing plants pass along a predetermined path on the frame of the machine they are held at an inclination to the horizontal and such inclination is laterally with respect to a vertical plane registering with or passing through the path of travel of the plants thus conveyed.

Attention is called to the fact that the members or shields 167 and 169 overlie the conveyor mechanism except at the point where the stalks are gripped and projected upwardly. By arranging these chains on an inclination as shown, the bean pods which fall through onto the stalk conveyor at the zone between the two members 167 and 169 will be carried away by the stalk conveyor with the stalks. Those pods which fall on the upper shield 167 will slide downwardly and since the shield 167 is raised above the plane of the shield 169 most such pods will jump the gap and will slide down 169 onto the shaker conveyor.

It will be appreciated that the picking mechanism is sufficiently forceful to project the beans outwardly against the shields 265 and 266 and against a canvas or other cover which covers the opening between 184 and 185. This covering is removable in order to give access to the picking mechanism.

*Plow*

A plow is mounted under the stalk puller to assist the puller in lifting the bean stalks from the ground, see Figures 3 and 4. The plow beam 172 is mounted below the main frame member 1 and at the forward end curves beneath the stalk puller to hold a plow point 173 which breaks the soil about the roots of the bean stalk. The plow beam 172 is pivotally mounted at the rear end on stud 175 fixed in the plow support 174. The plow support 174 is welded to the main frame member 1 and extends downwardly to hold the stub 175. A conventional type of hand lever 182 is used to control the depth of the plow in the ground and to hold the plow out of the ground while turning at the ends of the rows. The hand lever 182 is pivotally mounted on the stud 180 which is secured in the segment 181. This segment 181 is mounted on the main frame member 1 by the bolts 183. The hand lever has an arm 179 in the end of which is fixed a stud 178. A connecting rod 177 pivotally mounted on stud 178 extends downwardly to the stud 176 which is securely fixed in the central portion of plow beam 172.

Pod pickers

Mounted over the stalk conveyor are the pod pickers or crop stripping means comprising two oppositely disposed revolving picker drums, which have fingers adapted to hook under the stem of the bean pod and pull the pod loose from the stalk. The pod pickers are supported in a frame made up of the two longitudinal frame members 184 and 185 welded to the transverse tubular membrs 186 and 187. This pod picker frame is supported to the main frame at the front in the arched frame member 12 by bolts 188, see Figure 1. At the rear the picker frame is supported by the vertical frame members 15 and 16.

Figures 27, 28, 29:
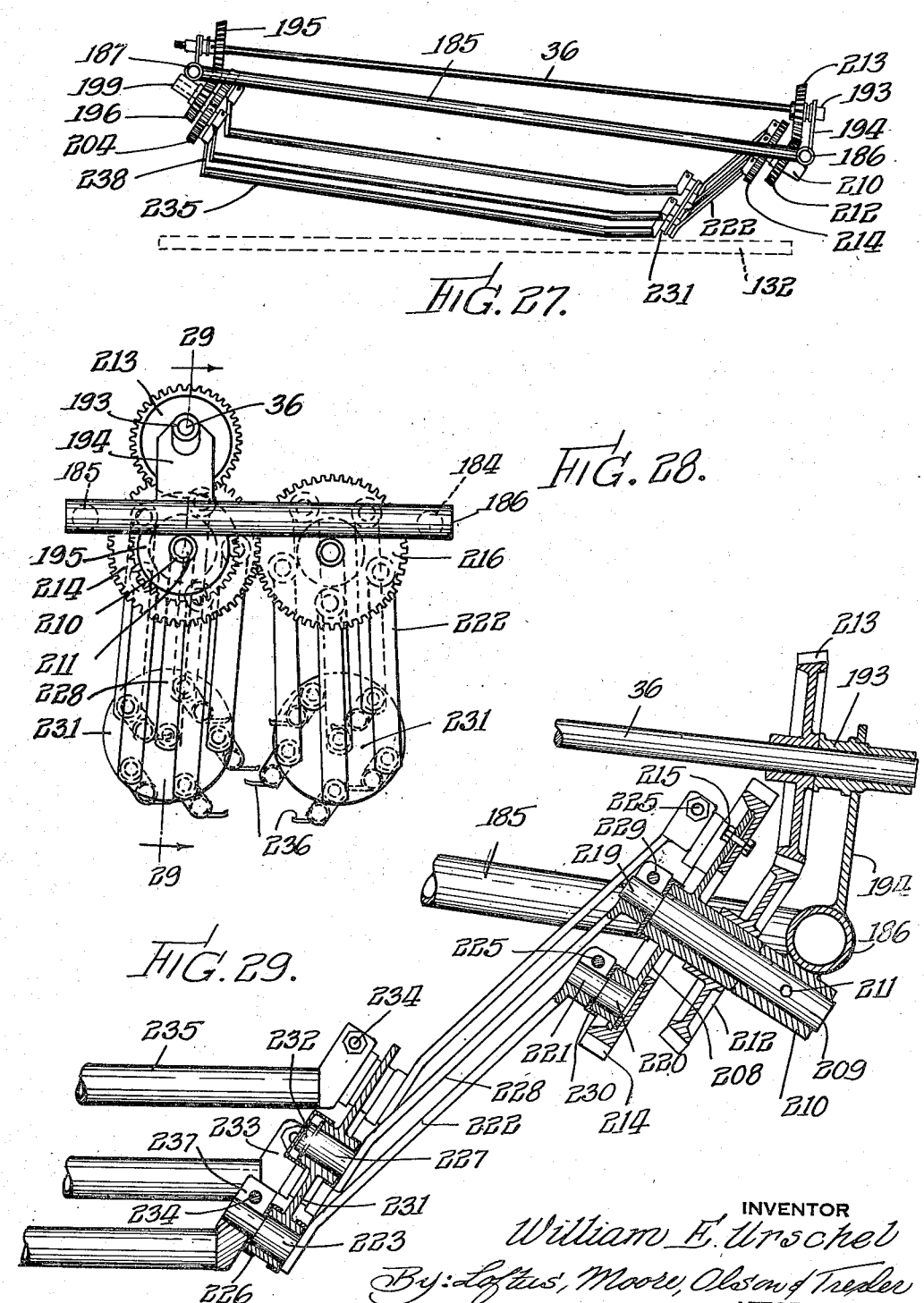
Figure 27 is a side view of the pod picker unit.
Figure 28 is a rear view of the rear pod picker drive.
Figure 29 is a side view in section of the rear picker drive taken on line 29—29 of Figure 28.

Referring to Figures 21, 24 and 27, the pod pickers are driven by the shaft 36 which is journaled at the forward end in bearing 189 secured in the bracket 190. This bracket 190 is welded to the pod picker frame member 187. The rear end of shaft 36 is journaled in bearing 193 of the bracket 194 which is welded to the picker frame member 186. Shaft 36 is driven by shaft 32 through the universal joint 35. Bevel gear 195 (see Figure 24) secured on shaft 36 drives bevel gear 196 which is keyed on the hub of the front drive plate 197. This front drive plate 197 is rotatably mounted on stud 198 which is secured by pin 201 in the knob 199, welded to the picker frame member 187. Spur gear 204 fastened to front drive plate 199 by bolts 205 drives gear 206 which is bolted to the front drive plate of the opposed picker drum.

A cap 200 on the end of the hub of the front drive plate excludes dust and retains grease in the bearing.

At the rear end of the picker drum is a rear drive plate 208 which is rotatably journaled on stud 209, see Figures 28 and 29. This stud 209 is fixed by pin 211 in the knob 210 which is welded to the picker frame member 186. Bevel gear 212 keyed to the hub of the rear drive plate 208 is driven by bevel gear 213 which is keyed to the shaft 36. Spur gear 214 secured to the rear drive plate 208 by bolts 215 drives gear 216 which is secured to the rear drive plate of the opposed picker drum. The rear drive plate 208 has five equally spaced outer bearings in which are journaled the studs 220. Grease caps 230 on the studs 220 exclude dirt from the bearings. Arms 222 are securely clamped on the projecting portions 221 of the studs 220 by the bolts 225 which draw together the split knobs of the arms 222. The lower ends of the arms 222 are provided with the studs 223, which are journaled in the outer bearings of the end plate 231. Dust caps 226 on the studs 223 prevent dirt from getting into the bearings. A stationary arm 228 is secured to the extending portion 219 of the stud 209 by the bolt 229. The lower end of the stationary arm 228 has a stud 227 on which the end plate 231 is rotatably mounted. The end plate 231 is retained in position on the stud 227 by a washer and the cotter pin 232. A cap 233 protects the bearing from dust.

Referring to Figure 29, mounted between the end plate 231 and the front drive plate 197 are the picker bars 235, to which the picker fingers 236 are welded. These picker bars 235 are tubular in section as shown in Figure 22. The rear ends of the picker bars have split knobs 237 (see Figure 29) which are mounted on the extending portions 224 of the studs 223 and securely clamped thereon by the bolts 234. At the forward end of each picker bar 235 is welded an arm 238, which has a split knob 239. This knob 239 is mounted on the extending portions 242 of the studs 241 and secured thereto by bolts 240 (Fig. 24). The construction of the opposite picker drum is the same as the one heretofore described.

From the foregoing description, and by reference to Figure 29, it will be seen that the arms 222 at the rear of the pickers will always remain in a position parallel with the central stationary arm 228 and with each other as the pickers revolve, which holds the pickers in a position best adapted to pick the bean pods. Thus the picker fingers move inwardly and upwardly through the bean stalk always pointed in the same direction. As the pickers pass through the stalk, the fingers hook under the stem of the bean pod between the pod and the stalk and pull the pod free from the stalk.

Because of the fact that the picker drums are gear driven at each end, all binding in the picker bearing has been eliminated, thus providing a free running unit.

Cleaning mechanism

Because of the inclination of the conveyed stalk and the arrangement of the pickers with respect thereto, as shown in Figure 6, the greater portion of the bean pods when picked fall upon the shaker conveyor 246. The rest of the pods which fall on the sheet metal plates 167 and 169 slide into this shaker conveyor 246. A conventional type fan 245 (Figs. 1, 2 and 4) directs a blast of air over and longitudinally of the shaker conveyor 246 through the upper outlet 244. The bean pods when falling into the conveyor shaker 246 must fall through the air blast. Leaves and small pieces of bean stalk are separated by this blast from the bean pods and blown from the harvester at the rear end. The forward section of the shaker conveyor has the imperforate floor 247 and the rear portion has a plurality of notched slats 248. Below the notched slats 248 is another ridged floor 249. The shaker conveyor 246 is supported at the front on the arms 250 and 251 and at the rear on arms 252 and 253. The front arms 250 and 251 are pivotally mounted on studs 254 secured in the main frame members 3 and 5. A rod 255 secured in the front end of the shaker conveyor 246 is pivotally mounted in the upper bearing of the arms 250 and 251. The rear arms 252 and 253 are pivotally mounted on studs 256 which are secured in the brackets 257 welded to the frame member 7. Studs 258 are secured in the sides of the shaker conveyor 246 and are pivotally mounted in the upper bearings of arms 252 and 253. A reciprocating motion is imparted to the shaker conveyor 246 by an eccentric 259 keyed to the transverse shaft 45. The eccentric rod 260 is mounted on the bolt 269 which is secured between the reinforcing straps 261 of the shaker conveyor 246. Due to the angle at which the supporting arms 250, 251, 252 and 253 are set in relation to the shaker conveyor, the shaker conveyor will move upwardly and rearwardly on one phase of its movement and downwardly and forwardly on the other phase of its movement. Bean pods on the floor 247 of the shaker conveyor are boosted from one notch to the next notch and thus conveyed to the rear of the machine. Also this movement pushes the leaves among the beans into the air blast by which the leaves are blown from the machine. When the bean pods reach the spaced slats 248 of the shaker, the bean pods fall through between the slats to the imperforate floor section 249. Another air outlet 262 from the fan 245 directs an air blast under the slats and thus effects further separation of the leaves and dust from the pods. Any bushes or cluster of leaves will not fall between the slats 248. The leaf cluster and pieces of stalk will be boosted along on top of the notched slats 248 and discharged from the machine thus separated from the bean pods. The bean pods which fall on the imperforate floor 249 are discharged into a suitable container 270 carried on a platform 264. This platform 264 is suspended from the main frame member 7. To prevent the bean pods from flying out of the machine at the side, sheet metal shields 265 and 266 are bolted to the picker frame members 184 and 185, see Figure 6. Shield 265 extends downwardly to the plate 167 to which it is bolted. Shield 266 extends downwardly to direct the pods into the shaker conveyor.

Operation of the bean and pea harvester

The harvester is pulled down the row of bean stalks by any suitable tractor. The clevis 8 on the front end of the main frame is hinged to the draw bar of the tractor by a pin in holes 17 of the clevis 8. The machinery of the harvester is rotated by the power take-off of the tractor through a universal joint assembly which transmits the power of the take-off shaft of the tractor to the shaft 21 of the harvester. The machine is pulled down the row of bean stalks so that the line where the puller chain and the puller belt come together is in direct registry with the bean row. As the harvester advances down the row, the bristles of the pod lifter brushes raise up the ends of the low growing pods and straighten prostrate stalks and guide the stalks between the puller chain and the rubber faced puller belt. The bean stalks are engaged between the endless puller chain and the rubber faced belt and, as the machine progresses down the row, the stalks will be gradually lifted from the ground. The plow passing under the bean row loosens the ground so that the bean stalks may be easily pulled therefrom. After the beans stalks are pulled from the ground, they are elevated and conveyed to the stalk conveyor which grasps the stalk by the root portion which projects below the stalk puller. It will be noted that the bean stalks are engaged at the front end of the pullers in a vertical position. After the stalks are pulled from the ground, the puller chain and belt assume a gradual twist so that when the stalk reaches the rear end of the stalk puller in a position to be grasped by the stalk conveyor, the axis of the stalk will be perpendicular to the stalk conveyor. The stalk is carried further rearwardly under the pod pickers which, beginning at the top of the bush, pass the picker fingers through the stalk. As the stalk is carried further rearwardly by the stalk conveyor, the picker fingers gradually work down until the entire stalk is combed and the bean pods pulled from the stalk. The crop denuded stalks are discharged from the rear end of the machine by the stalk conveyor to fall to the ground. The bean pods fall in the shaker conveyor where the broken bean stalks and leaves are blown or removed from the pods. The bean pods are discharged from the shaker conveyor into any suitable container which is carried on the platform secured to the frame of the machine.

It is thought that the invention and numerous of its attendant advantages will be understood from the foregoing illustrative description and it is obvious that numerous changes may be made in the form, construction and arrangement of the several parts without departing from the spirit or scope of the invention or sacrificing any of its attendant advantages, the form herein described being a preferred embodiment for the purpose of illustrating the invention.

Having thus described the invention, what is claimed as new and desired to be secured by Letters Patent is:

1. A pea and bean harvester comprising a frame, actuatable means on said frame for conveying stalks of plants along a predetermined path with respect to said frame, picking mechanism mounted on said frame on opposite sides of the path of movement of the conveying means and the plants grippingly conveyed thereby, each of said picking mechanisms including a plurality of picker arms, a plurality of oppositely driven picker heads, each of said picker heads comprising a pair of oppositely facing parallel rotatable driven discs, means for driving each of said discs, a plurality of peripherally and pivotally disposed crank arms on each of said discs, each crank arm carrying a picker bar, and each picker bar carrying a plurality of picker fingers whereby upon rotation of said pair of discs with confronting crank arms the opposed sets of picker fingers will rake or hook the pods from the plants which are disposed between the front and rear sets of rotatable discs.

2. A crop harvester comprising a frame, movable conveying means disposed on the frame and arranged to receive and to grip stalks of crop-carrying plants and grippingly to convey the plants along a fixed path on the frame, crop stripping means disposed adjacent the path of travel of the plants for stripping the crops from the plants as conveyed, including means for projecting a portion of said crops through the air and laterally of the conveying means, crop conveying means disposed laterally of and substantially parallel to the plant conveying means to receive said projected crops, said crop conveying means being disposed on said frame below the level of the plant conveying means, refuse separating and conveying means above said crop conveying means and below the level of said plant conveying means and means associated with said last mentioned crop conveying means whereby unprojected crops stripped from the held and conveyed plants are directed onto said refuse separating and conveying means.

WILLIAM E. URSCHEL.

REFERENCES CITED

The following references are of record in the file of this patent:

UNITED STATES PATENTS

| Number | Name | Date |
| --- | --- | --- |
| 1,145,011 | Funk et al. | July 6, 1915 |
| 1,233,418 | Stone | July 17, 1917 |
| 1,247,070 | Benjamin | Nov. 20, 1917 |
| 1,727,020 | Urschel | Sept. 3, 1929 |
| 1,873,681 | Urschel | Aug. 23, 1932 |
| 1,942,011 | Urschel | Jan. 2, 1934 |
| 1,948,975 | Urschel | Feb. 27, 1934 |
| 1,999,638 | Richards | Apr. 30, 1935 |
| 2,291,093 | Hurst et al. | July 28, 1942 |
| 2,311,169 | Gordon et al. | Feb. 16, 1943 |